United States Patent [19]

Mochida et al.

[11] Patent Number: 5,193,196
[45] Date of Patent: Mar. 9, 1993

[54] PROCESS REQUEST ARBITRATION SYSTEM WHICH PREFERENTIALLY MAINTAINS PREVIOUSLY SELECTED PROCESS REQUEST UPON RECEIPT OF A SUBSEQUENT REQUEST OF IDENTICAL PRIORITY

[75] Inventors: Tetsuya Mochida; Shigeo Tsujioka, both of Yokohama; Masami Jikihara, Yamato; Hitoshi Sadamitsu, Ashigarakami; Kazushi Kobayashi, Ebina, all of Japan

[73] Assignee: Hitachi, Ltd., Tokyo, Japan

[21] Appl. No.: 331,297

[22] Filed: Mar. 31, 1989

[30] Foreign Application Priority Data

Apr. 4, 1988 [JP] Japan .................................. 63-82617

[51] Int. Cl.⁵ .................................. G06F 13/36
[52] U.S. Cl. .................................. 395/725; 364/259.2; 364/242.6; 364/242.7; 364/240; 364/DIG. 1
[58] Field of Search ... 364/200 MS File, 900 MS File; 395/725

[56] References Cited

U.S. PATENT DOCUMENTS

| | | | |
|---|---|---|---|
| 3,735,357 | 5/1973 | Maholick | 364/200 |
| 3,964,054 | 6/1976 | Annuntiata | 364/200 |
| 4,038,642 | 7/1977 | Bouknecht | 364/200 |
| 4,172,284 | 10/1979 | Heinrich | 364/200 |
| 4,214,304 | 7/1980 | Shimizu | 364/200 |
| 4,220,990 | 9/1980 | Alles | 364/200 |
| 4,286,322 | 8/1981 | Hoffman | 364/200 |
| 4,309,754 | 1/1982 | Dinwiddie | 364/200 |
| 4,338,662 | 7/1982 | Yokoyama | 364/200 |
| 4,342,083 | 7/1982 | Freedman | 364/200 |
| 4,358,829 | 11/1982 | Branigin | 364/900 |
| 4,374,413 | 2/1983 | Comfort | 364/200 |
| 4,423,480 | 12/1983 | Bauer | 364/200 |
| 4,435,780 | 3/1984 | Herrington | 364/900 |
| 4,438,489 | 3/1984 | Heinrich | 364/200 |
| 4,590,555 | 5/1986 | Bourret | 364/200 |
| 4,642,758 | 2/1987 | Teng | 364/200 |
| 4,654,778 | 3/1987 | Chiesa | 364/200 |
| 4,794,526 | 12/1988 | May | 364/200 |
| 5,025,370 | 6/1991 | Kaegel | 364/200 |

Primary Examiner—Thomas C. Lee
Assistant Examiner—Eric Coleman
Attorney, Agent, or Firm—Antonelli, Terry, Stout & Kraus

[57] ABSTRACT

A plurality of process requests generated from processing units, for example, direct memory access (DMA) channels are controlled by a preference circuit in accordance with a priority level assigned to each of the processing unit. An information of the highest priority obtained processing unit and its priority level is stored in latches. Another process requests having the same priority level as the stored processing unit are inhibited from being supplied to the preference circuit, so that the first generated process request is accepted and executed prior to acceptance of the another process requests having the same priority level.

8 Claims, 5 Drawing Sheets

PROCESS REQUEST ARBITRATION SYSTEM WHICH PREFERENTIALLY MAINTAINS PREVIOUSLY SELECTED PROCESS REQUEST UPON RECEIPT OF A SUBSEQUENT REQUEST OF IDENTICAL PRIORITY

BACKGROUND OF THE INVENTION

The present invention relates to priority control in interrupt handling or bus arbitration control, especially a method and apparatus suitable to priority control for indicating a priority level to each channel.

In a system, in which process requests from a plurality of independent processing units are generated with arbitrary timings, it is necessary to use a preference circuit for judging priority. In the prior art, there has been used a method to give inherent priority to each processing unit. Namely, if within a period from a request of one processing unit to a grant of the process request another request of another processing unit occurs, the preference circuit selects one of the processing units which should be accepted in accordance with an inherent priority. In this priority control, if process requests having high priority and frequently generated, it will possibly lead to a long wait for process requests having lower priority.

In order to exclude the possibility of this problem occurring, for example, as described in Japanese Laid Open Application No. 62-111345 (published on May 22, 1987), there have been developed some techniques, in one of which the first occurred process request constantly has priority, even if it has a low inherent priority, by using a register for indicating waiting requests having higher priority together with registers for holding channel numbers corresponding to the processing units having already requested. Further, there have been considered other techniques such as a so-called round robin method, in which the order of priority is changed at each acceptance of the request, and the same priority level is allotted to channels having the same emergency.

In the above mentioned prior method for using a register for indicating waits of requests, it is necessary to use means for comparing priority between the precedent process request and the newly generated process request, and further it is inconvenient for the higher priority request to wait unnecessarily because of the lower priority request. Further, in the above mentioned round robin method, since it is impossible to previously set the fixed order of priority, it is difficult to discriminate the high priority requests having emergency and the low priority requests.

Further, in the last mentioned technique, it is necessary to determine a unit which should be accepted using another method except the order of priority, in a case that a plurality of the process requests having the same priority level occurs. Therefore, for example, there has been used a method for giving priority to a channel having a lower number. As a result, impartiality of the channels having the same priority level is disturbed or lost.

SUMMARY OF THE INVENTION

It is an object of the present invention to provide a method and apparatus having impartiality of priority control to a system, in which it is necessary to previously set a priority level in response to a level of emergency of each process request.

It is another object of the present invention to provide a method and apparatus for allotting the order of priority to processing units having different emergencies.

It is further object of the present invention to provide a method and apparatus for impartially accepting process requests of units having the same emergency.

It is further object of the present invention to provide a method and apparatus for controlling priority of direct memory access (DMA) requests.

To attain the above mentioned objects, the present invention provides a method for giving priority to a first generated process request in a case where process requests having the same priority level conflict, that is, if another process request having the same priority level as the first generated process request has been generated, the first generated process request will be given the priority of processing.

Further, to attain the above mentioned objects, the present invention provides a priority control apparatus having means for outputting information of a processing unit which gets the highest priority of processing in accordance with priority levels allotted to a plurality of processing units, and means for giving a higher priority to the first generated process request in a case where a plurality of process requests having the same priority level occurs.

In the present invention, if another process request is generated prior to acceptance of the first generated process request, and the another process request has a priority level higher than the level of the first generated process request, the processing unit which should be accepted to process is renewed.

A priority control apparatus of the present invention includes means for holding information of the processing unit which gets the highest priority, means for holding a priority level corresponding to the processing unit, comparing means for comparing an input and output of the level holding means, and means for renewing the content of the information holding means in response to an inconsistent output of the comparing means or an acknowledge signal for accepting the process request.

In the present invention, when another process request from another processing unit is generated before a process request from one processing unit is generated, if the other processing unit has a higher priority level than the one processing unit, information of the unit having the priority is renewed. If the other processing unit has the same priority level as the one processing unit, the information of the unit having the priority is not renewed.

Newly, the comparing means compares the input level and the output level of the level holding means; and, if there exists an inconsistency, the renewing means supplied a renewal signal to the information holding means. Therefore, when the information of the unit having the priority changes, if there are no changes of the priority levels, the content of the information holding means is not renewed.

DETAILED DESCRIPTION OF THE PREFERRED EMBODIMENTS

Figure 1:
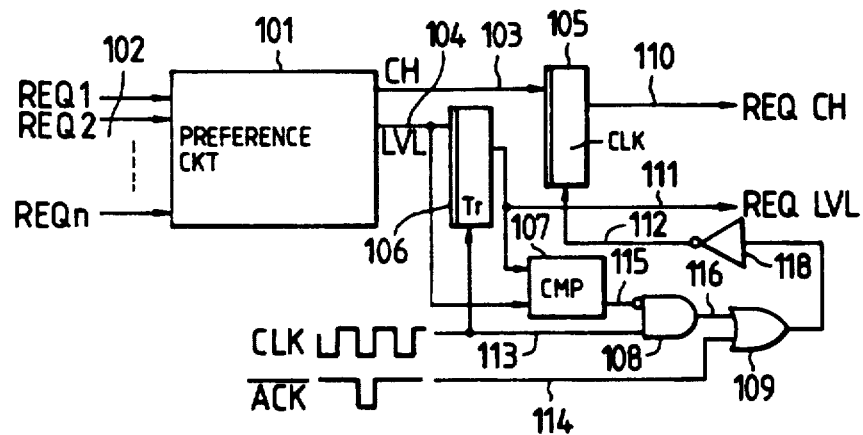
FIG. 1 shows a circuit diagram of an embodiment of the present invention.

FIG. 1 shows a block diagram of an embodiment of the present invention. In FIG. 1, the numeral 101 denotes a preference circuit having a priority level table which can be set in advance, and which gives priority to the process unit having a lower channel number, when a plurality of requests from process units having the same priority level conflict. Such a circuit have already been realized in Hitachi, Ltd., Work Station 2050/32. The preference circuit 101 receives process requests REQO~REQn 102, and outputs information indicating the highest request channel (CH)103 and the highest request level (LVL)104 in real time. If there is no request, the circuit 101 outputs zero.

A channel register 105 is a through latch holding the channel 103, and a level register 106 is an edge trigger flip flop holding the level 104. In this embodiment, the through latch is a latch which outputs an input signal when its input clock (CLK)113 is "H", and which holds the input signal at a point when the input clock (CLK)113 changes from "H" to "L".

Suppose that a process request is generated, and the channel 103 and the level 104 become a value other than zero, the level 104 supplied to a comparator (CMP)107 and a output (in this case, zero) of the level register 106 become different values. As a result, an output 115 of the comparator 107 is negated, and a clock (CLK)113 is delivered to an output 116 of an AND gate 108. This output is used as a latch signal 112 of the channel register 105 through an OR gate 109 and an inverter 118. In this embodiment, the AND gate 108, OR gate 109 and inverter 118 form means for renewing the contents of the channel register 105.

Here, if another process request is generated before a prior process request is accepted and the priority of the other process request is higher than the prior process request, the level output 104 of the preference circuit 101 is changed to a higher level, and the channel output 103 is changed to the channel having the higher level. At this time, since the level register 106 holds the prior level, the output 115 of the comparator 107 is negated, and the channel register 105 is latched again, so that the channel having the higher level is output as the request channel signal (REQ CH)110.

If the newly generated process request has the same level as that of the preceding process request, the level output 104 does not change. Therefore the output 115 of the comparator 113 continues to be asserted, and the output 110 of the channel register 105 does not change. The request channel varies, only when the newly generated process request having a higher level is generated, or an acknowledge signal (ACK)114 is generated at acceptance of the process request channel. As a result, the later generated process request having the same priority level as the previously generated process request is not accepted prior to the previously generated process request.

As explained above, when the process requests having the same priority level conflict, the preceding process request is accepted and executed. In this embodiment, it becomes possible to minimize the required hardware amount. When the highest request level is allotted to a plurality of channels having the highest emergency, it is guaranteed that the process request having the highest priority level generated when there are no other process requests having the highest priority level is accepted and executed with the highest priority.

Figure 2:
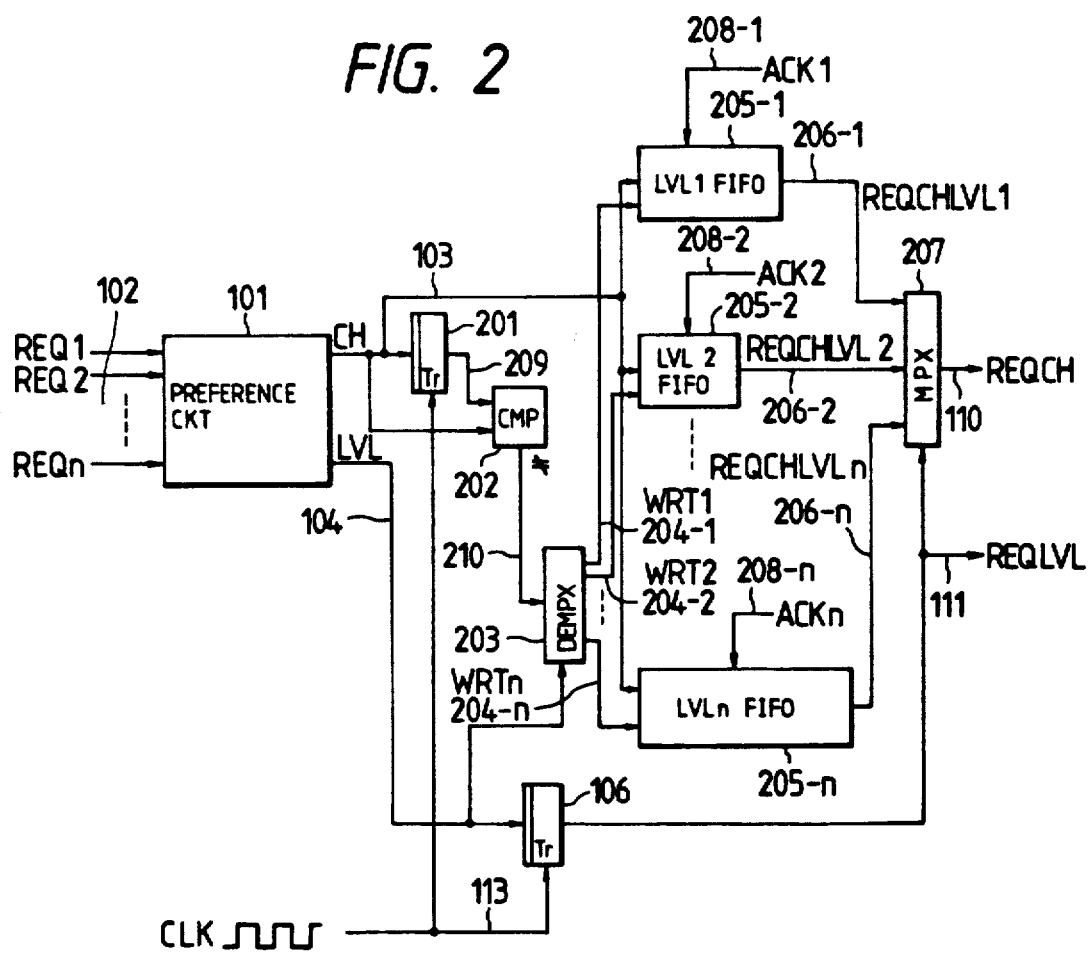
FIG. 2 shows a block diagram of another embodiment of the present invention.

FIG. 2 shows a block diagram of another embodiment of the present invention. In FIG. 2, the same numerals as ones shown in FIG. 1 designate the same elements. The priority channel 103 provided from the preference circuit 101 is stored in a channel buffer 201 formed by an edge trigger latch, and supplied to one of a plurality of First-in-first-out (FIFO) buffers 205-1~205-n corresponding to each priority level. A comparator (CMP)202 is used for comparing an output 209 of the channel buffer 201 and the channel output 103 in order to detect alteration points of the output 209 and the channel output 103. If there is a disagreement between the output 209 and the channel output 103, an output 210 of the comparator 202 is delivered to a corresponding one of the FIFO buffers 205-1~205-n as a write timing signal (WRT1~WRTn)204-1~204-n via a de-multiplexer (DEMPX)203 in accordance with the level output (LVL)104. The outputs (REQ CHLVL1~REQ CHLVLn)206-1~206-n of the FIFO buffers 205-1~205-n are provided to a multiplexer (MPX)207, selected by the request level signal (REQ LVL)111, and the process request channel output (REQ CH)110 can be obtained. An unshown processing apparatus supplies corresponding one of acknowledge signals (ACK1~ACKn) 205-1~205-n when one of the process requests is accepted, the corresponding FIFO buffer renews an inside read out pointer and outputs a next generated process request channel having the same priority level.

Figure 3:
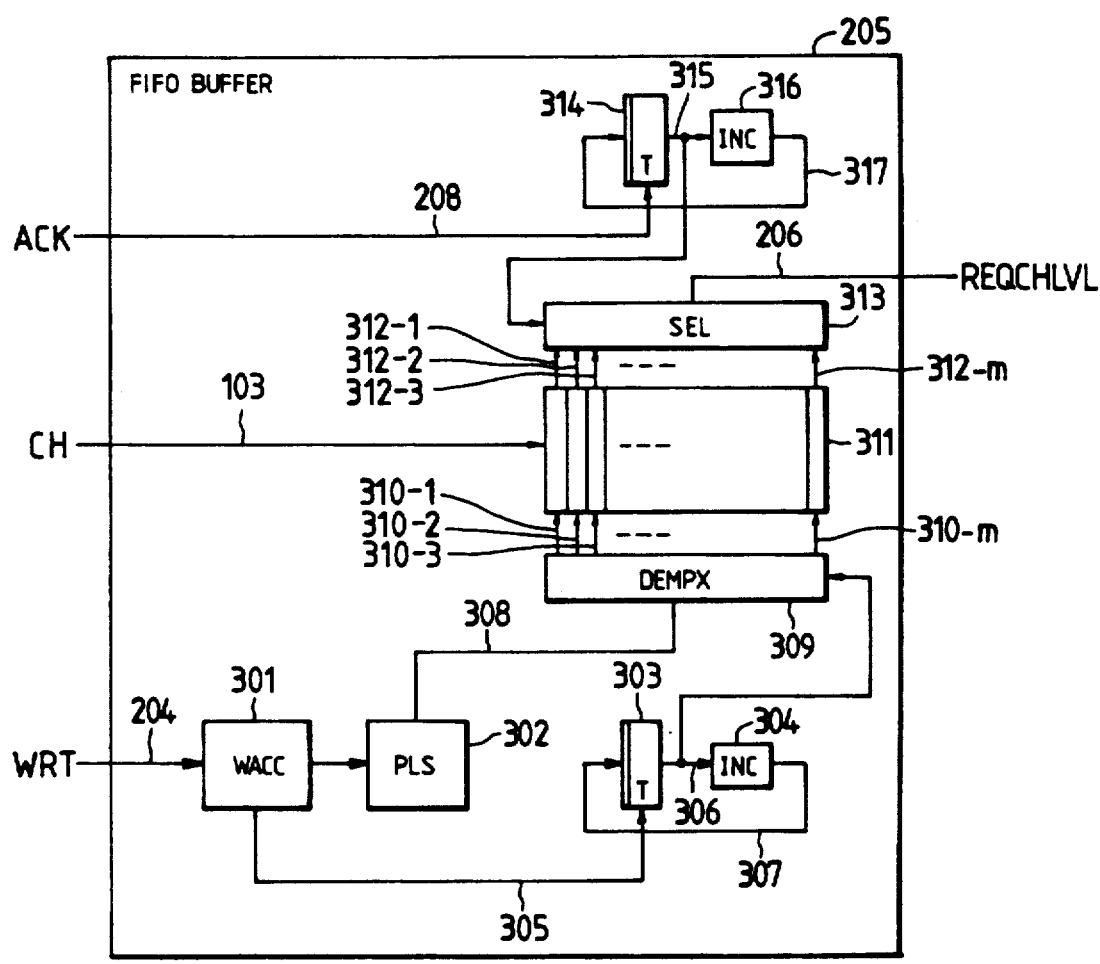
FIG. 3 shows a block diagram of a FIFO buffer shown in the embodiment of FIG. 2.

FIG. 3 is a block diagram of an embodiment of the FIFO buffer 205. In FIG. 3, a write access control circuit (WACC)301, which receives the write timing signal 204, drives a latch pulse generator (PLS)302. The output latch pulse 308 of the generator 302 is applied to one of the lines 310-1~310-m via a demultiplexer (DEMPX)309, which provides a latch pulse 310 in response to an output 306 of a write pointer hold latch 303. As a result, the channel output (CH)103 is stored into a FIFO register 311 indicated by the write pointer. After driving the latch pulse generator (PLS)302, the write access control circuit (WACC)301 generates a latch signal 305 for the write pointer hold latch 303, an output 307 of an increment circuit (INC)304 receiving the output 306 of the latch 303 is latched, and the value of the write pointer is incremented.

The outputs 312-1~312-m of the FIFO register 311 are selected by a selector (SEL)313 in response to the output 315 of the read out pointer hold latch 314, and the corresponding process request channel level (REQCHLVL)206 is delivered. This value of the read out pointer is incremented when the acknowledge signal (ACK)208 is supplied to the latch 314 and the output 307 is latched. The values of the read out pointer and the write pointer become zero after wrapping around to the maximum value. The initial values are set to zero.

The number of the registers in the FIFO group 311 is set to the number of the channels corresponding to the FIFO buffer.

In this embodiment, since process requests having the same priority level are stored in the FIFO buffer 205 in the sequence of their generation, and are output from the FIFO buffer 205 in the sequence of their generation, it becomes possible to obtain perfect priority control in a case where more than two of the channels conflict. Therefore, it is suitable for a system in which the wait time from request generation to request acceptance is long, where conflicts occur frequently, and where a few of the channels having the same priority level conflict.

Figure 4:
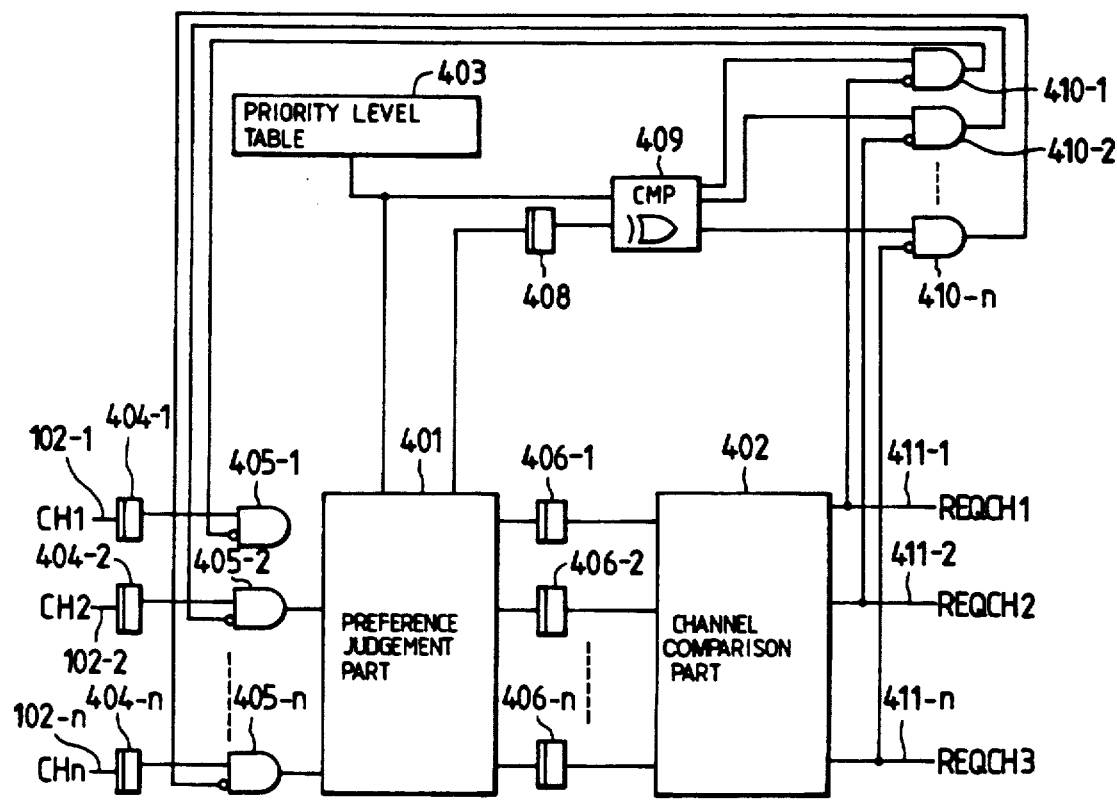
FIG. 4 shows a circuit diagram of another embodiment of the present invention.

Next, a third embodiment of the present invention will be explained using FIG. 4. In this embodiment, a priority control apparatus including a priority level table 403 for setting a priority level to each channel, a preference judgement part 401 for selecting channels having the highest priority level among the process requesting channels in accordance with the table, and a channel comparison part 402 for selecting one channel from the channels having the same priority level, is used. The preference judgement part 401, the channel comparison part 402, and the priority level table 403 have been used in Hitachi, Ltd., Work Station 2050/32.

The requests 102-1~102-n of the channels are interiorly synchronized by synchronized latches 404-1~404-n, and are supplied to the preference judgement part 401 through AND gates 405-1~405-n, each of which ANDs the request 102 and a later mentioned request suppress signal. The preference judgement part 401 selects the highest priority channel from the process request channels. As a result, one of the latches 406-1~406-n corresponding to the highest priority channel becomes "ON" and is placed in a hold state. There are some possibilities that a plurality of channels are selected by the preference judgement part 401. Namely, process requests of the same priority levels simultaneously may be generated, that is, occur within one inner synchronizing clock. In this case, the channel comparison part 402 selects one channel, so that one of the process request channel outputs (REQ CH1~REQ CHn)411-1 411-n is asserted.

The preference judgement part 401 outputs a signal representing the highest priority level, which signal is latched in a latch 408 having m bits. This latched level is compared with each channel level of the priority level table 403 by the comparator 409, and a signal corresponding to the channel assigned to this highest priority level is asserted. Further, the channel assigned to the highest priority level is excluded by AND gates 410-1~410-n, which supply request suppress signals to the AND gates 405-1~405-2 corresponding to the channels having the same priority level. By this construction, even if a process request having the same priority level is generated later, the request is not supplied to the preference judgement part 401. In this embodiment, a latch pulse having the same phase is applied to all the latch circuits 404, 406 and 408.

As apparent from the above, description, since the process requests having the same priority level generated subsequently are restrained, the first generated process request has priority. Further, in this embodiment, since all the latches are synchronously operated, it is possible to provide a high reliability circuit, and to make possible a large scale integrated (LSI) circuit having a good diagnostic characteristic.

Figure 5:
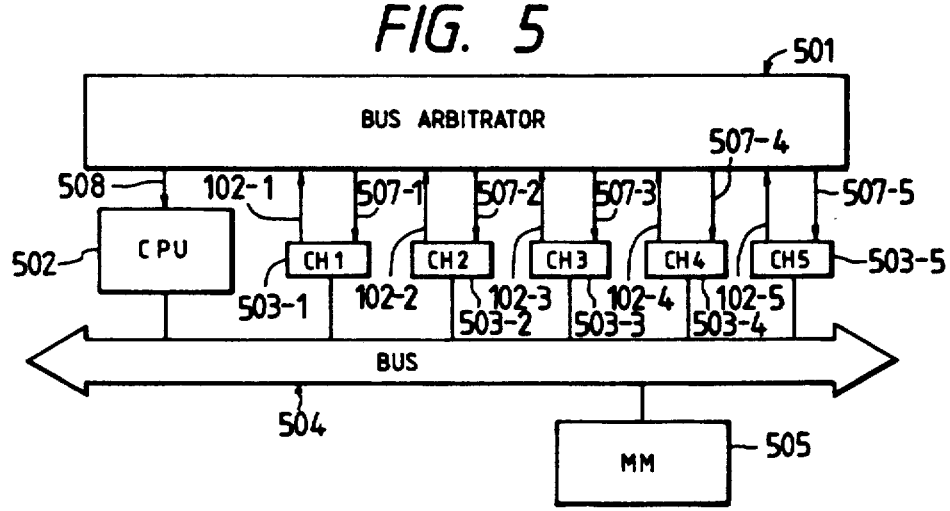
FIG. 5 shows a block diagram of a system of a DMA priority control.

FIG. 5 shows a block diagram of an application system of the present invention for a priority control apparatus of a direct memory access (DMA). A bus arbitrator 501 controls a central processing unit (CPU)502, and a plurality of channels (CH)503-1~503-5, which share a main memory (MM)505 via a bus 504. Usually, the CPU502 occupies the bus 504, so that it writes or reads out data into or from the MM505. If the five channels 503-1~503-5 assert process requests 102-1~102-5 for DMA as a bus acquisition request, a priority control apparatus of the present invention included in the bus arbitrator 501 executes the priority determination, and asserts one of the DMA process acknowledge signals 507-1~507-5 corresponding the channel having the highest priority level. At the same time, the bus arbitrator 501 outputs a bus acquisition signal 508 to the CPU502.

Suppose that the channels 503-1, 503-2 are the same communication channels, and they have the same highest priority level, the DMA requests of the channels 503-1, 503-2 have to be retried as errors, if the DMA requests do not end within a predetermined period. Other channels 503-3~503-5 have lower priority levels, since there are no restrictions in a DMA process wait time. Further, in this system, if another DMA request is generated during DMA processing, the next generated DMA request will be processed successively without giving back the bus to the CPU502.

Figure 6:
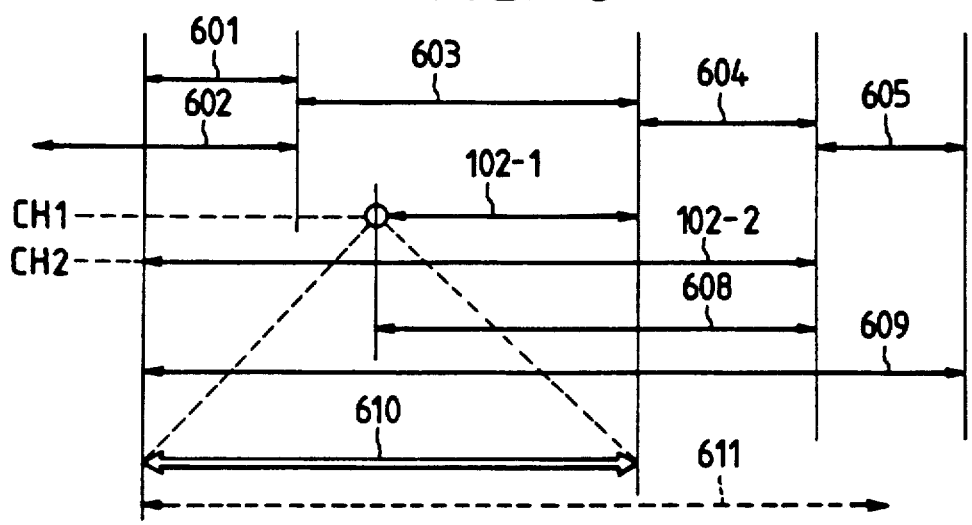
FIG. 6 illustrates a timing chart of the system shown in FIG. 5 using the prior art.

This DMA process wait time of channels 503-1, 503-2 in this construction will be explained by using FIGS. 6 to 9. FIG. 6 is a timing chart showing in a case in which a smaller number channel has priority in the conflict of the same priority level channels of the prior art. The DMA process request 102-2 is generated during a processing of the former generated DMA process 602, and the request timing thereof is a little late in a time period 601 for judging a bus release. Therefore, the next access becomes the CPU access 603. During this period 603, if the DMA process request 102-1 is generated, as shown in FIG. 6, the channel 503-1 having the smaller number comes to have the priority, so that the request 101-1 is executed at first and after that the request 101-2 from the channel 503-2 is executed. As a result, although the DMA process wait time 608 from the request generation to the DMA process end is comparatively short, the DMA process wait time 609 of the channel 503-2 becomes very long. If a permitted wait time 611 is shorter than the DMA wait time 609 of the channel 503-2, the DMA request of the channel 503-2 becomes an error. A generating period 610 having a risk for generating such an access order, as shown in FIG. 6, is a sum of the bus release judgement time 601 and the CPU processing time 603.

Figure 7:
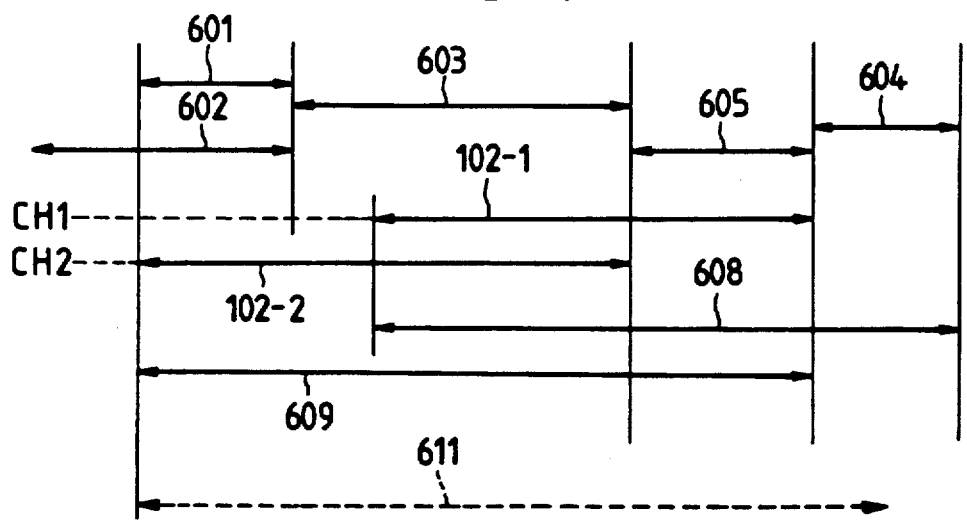
FIGS. 7, 8, and 9 illustrate timing charts of the system shown in FIG. 5 using the present invention.

FIG. 7 shows a time chart of the system using the present invention, in which the DMA requests is generated at the same timing as ones shown in FIG. 6. In this time chart, the DMA request 102-2 of the channel 503-2, which is generated earlier than the DMA request 102-1 of the channel 503-1, is processed prior to the DMA request 102-1. Therefore, the DMA process wait time 609 becomes shorter, so that if the permitted DMA process wait time 611 is smaller than a sum of the bus release judge time 601 and the CPU processing time 603, there is no error of the DMA process request of the channel 503-2.

Figure 8:
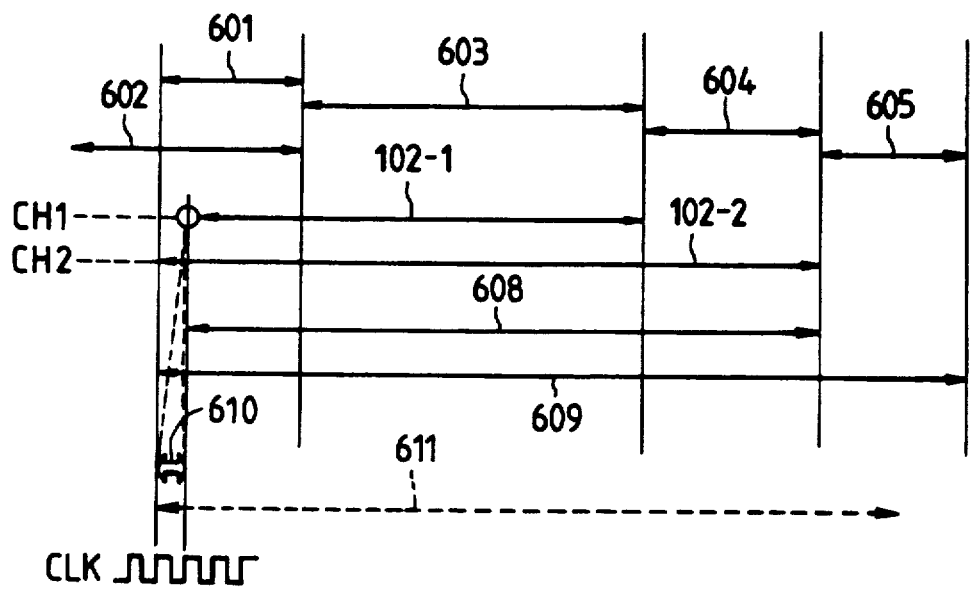

In the above mentioned embodiments of the present invention shown in FIGS. 1, 2, 3 and 4, since the access order becomes one shown in FIG. 7, for example, a case that the DMA process wait time becomes the maximum will be shown in FIG. 8. In FIG. 8, the requests of the channels 503-1, 503-2 completely conflict, that is, since they are generated within one period of the latch clock (CLK), it is not possible to analyze the consequences. As apparent from FIG. 8, the generating period 610 of such the request 102-1 becomes much shorter than the case shown in FIG. 6.

Figure 9:
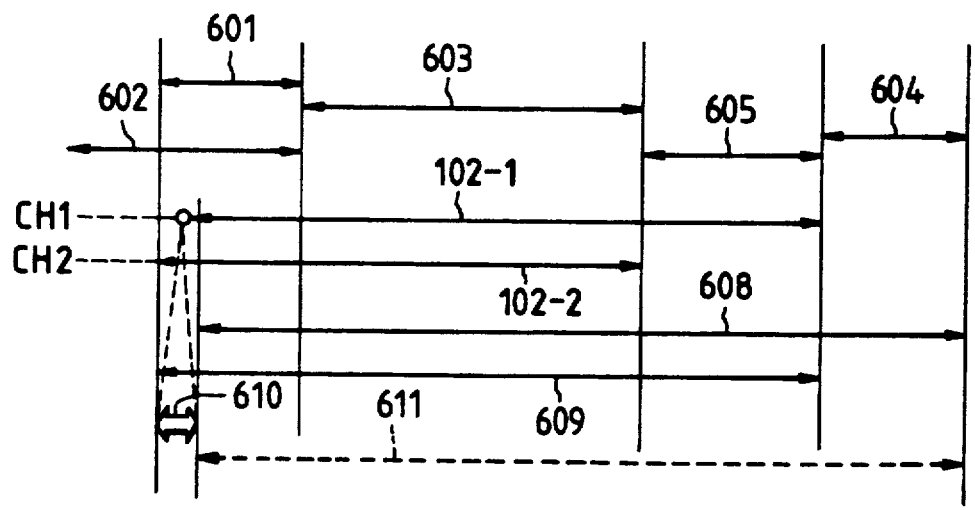

In the system using the present invention, the DMA process time becomes critical for the request 102-1 of the channel 503-1. FIG. 9 shows the generating period 610 having a risk for exceeding the permitted DMA process time to the channel 503-1. The period 610 is also much shorter than the one shown in FIG. 6.

As mentioned above in detail, the present invention can provide a system having high reliability by reducing errors and retries remarkably.

We claim:

1. An apparatus for controlling selection of process requests delivered from a plurality of processing units having predetermined priority levels, comprising:

means for granting priority to one of the process requests from the processing units in accordance with a predetermined priority level assigned to each processing unit, and delivering information identifying the processing unit to which priority is granted and the priority level thereof, means for holding said information and for outputting a selection signal selecting a processing unit identified by the held information, means for comparing said information of the priority level held in said holding means with a newly delivered priority level, and means for renewing said selection signal to identify another processing unit to which priority is granted by storing in said holding means subsequent information identifying the other processing unit and the priority level thereof when said comparing means indicates that a newly delivered priority level is different that the previously held priority level, and for maintaining said selection signal to continue to identify the processing unit to which priority has previously been granted by maintaining said information identifying the processing unit to which priority has previously been granted in said holding means when said comparing means indicates that the newly delivered priority level is the same as the previously held priority level.

2. An priority control apparatus according to claim 1, wherein:

said holding means including a plurality of first-in-first-out (FIFO) buffers, each of said FIFO buffers corresponding to each of said priority levels, and a plurality of the process requests having the same priority level being stored in ad read out from said FIFO buffers' in request generating sequence.

3. An apparatus for controlling selection of process requests delivered from a plurality of devices having predetermined priority levels, comprising:

preference means responsive to receipt of said process requests for selecting a process request of highest priority level and outputting information, including a device identifying signal and a priority level identifying signal, identifying the device which delivered the selected process request;

storage means for storing the information outputted by said preference means and for outputting at least a signal indicating a selected device;

comparison means responsive to said preference means for indicating when the information outputted by said preference means changes; and means responsive to said comparison means for controlling said storage means to change the signal outputted from said storage means to indicate a device having a priority level identified by the changed information outputted from said preference means when the priority level signal in said information has changed, and for controlling said storage means to maintain the signal outputted from said storage means when the priority level signal in said information has not changed.

4. An apparatus according to claim 3, wherein said storage means includes a latch for storing said device identifying signal in response to a trigger signal, and said comparing means includes means for generating said trigger signal only when said priority level identifying signal changes to identify a higher priority level.

5. An apparatus according to claim 3, wherein said storage means includes a plurality of FIFO buffers each for storing identifying signals for a respective priority level.

6. An apparatus according to claim 5, wherein said comparison means includes means for producing an enable signal when the device identifying signal produced by said preference means changes to identify a different device.

7. An apparatus according to claim 6, wherein said controlling means includes means responsive to the enable signal from said comparison means for enabling a FIFO buffer for the priority level indicated by the priority level identifying signal outputted by said preference means to store the device identifying signal being outputted by said preference means.

8. An apparatus according to claim 7, wherein said controlling means further includes means connected to said FIFO buffers for outputting a device identifying signal from a FIFO buffer which represents the priority level indicated by the priority level indicating signal being outputted by said preference means.

* * * * *